(No Model.)　　　　　　　　　　　　　　　　　2 Sheets—Sheet 1.
F. M. LYTE.
PROCESS OF MAKING ALKALINE CARBONATE AND CHLORINE.
No. 462,567.　　　　　　　　　Patented Nov. 3, 1891.

Witnesses:
C. Sedgwick
E. M. Clark

Inventor
F. M. Lyte
by
Munn
Attorneys

F. M. LYTE.
PROCESS OF MAKING ALKALINE CARBONATE AND CHLORINE.

UNITED STATES PATENT OFFICE.

FARNHAM MAXWELL LYTE, OF LONDON, ENGLAND.

PROCESS OF MAKING ALKALINE CARBONATE AND CHLORINE.

SPECIFICATION forming part of Letters Patent No. 462,567, dated November 3, 1891.

Application filed April 28, 1891. Serial No. 390,833. (No specimens.)

*To all whom it may concern:*

Be it known that I, FARNHAM MAXWELL LYTE, analytical chemist, of 60 Finborough Road, London, England, have invented new and useful Improvements in the Production of Alkaline Carbonates and Chlorine and their Derivatives, of which the following is a full, clear, and exact description.

My invention relates to a conjoint process of continuously producing alkaline carbonates and chlorine and their derivatives.

The formation of the alkaline carbonate is based on the decomposition of an alkaline nitrate by heating with, say, calcic carbonate, as shortly described by Lunge, the process of my invention including, however, the regeneration of the nitrate with the formation of a metallic chloride and the production therefrom of chlorine in the manner hereinafter described. The regeneration of the alkaline nitrate is effected by the conversion of the recovered nitric acid into a solution of plumbic nitrate, which on being precipitated with a solution of, say, sodic chloride will yield a solution of the alkaline nitrate and a precipitate of metallic chloride. From this chloride, while in a fused state, chlorine is produced by electrolysis, the metal recovered being oxidized for the formation of more plumbic nitrate, and so on, repeatedly.

The process is carried out as follows, it being understood that wherever sodic nitrate, sodic chloride, or sodic carbonate is mentioned the corresponding potassic salt may be substituted. To facilitate the comprehension of the process I have appended a drawing, in which—

Figure 1:
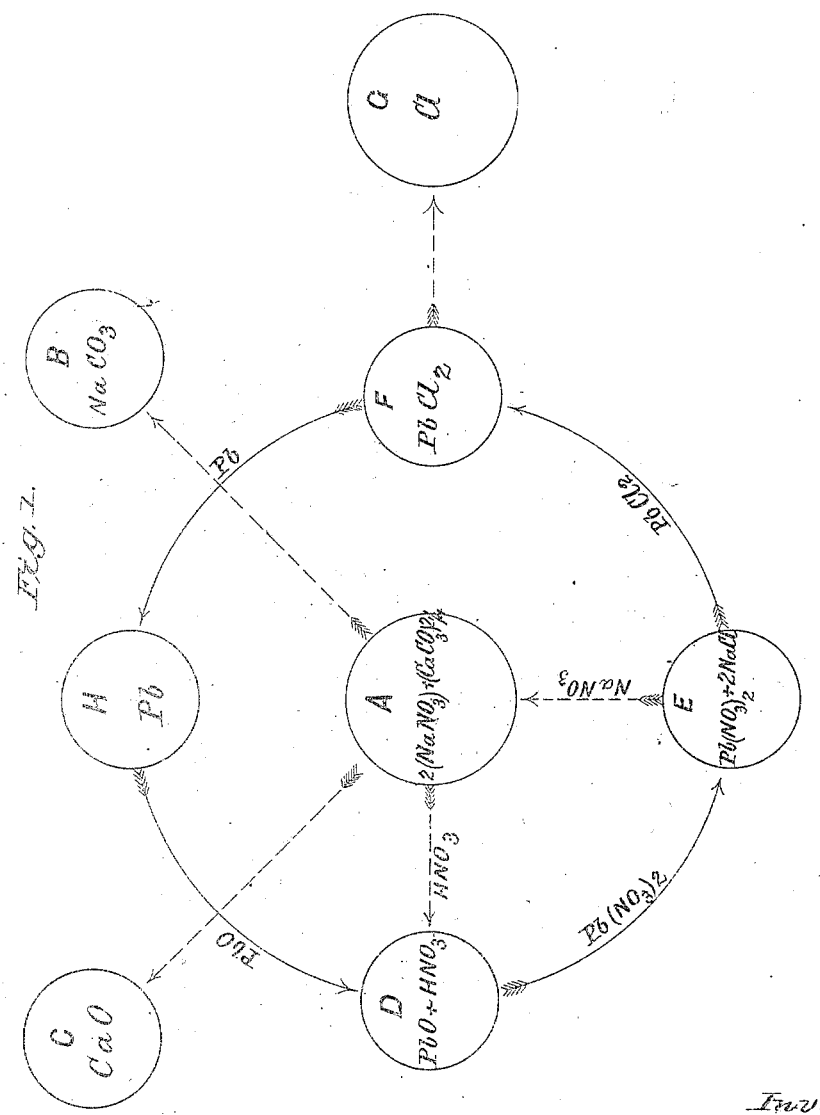
Figure 2:
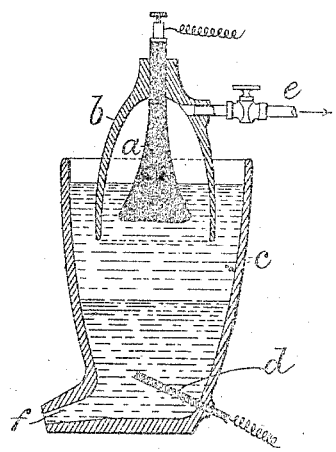

Figure 1 is a diagram illustrating the cycle of operations, it being understood that the circles designated by reference-letters indicate not apparatus, but the materials in the various stages of the process; and Fig. 2 is a vertical sectional view of the electrolyzing apparatus.

Commencing, then, at A, Fig. 1, sodic nitrate mixed with calcic carbonate in the proportions given by Lunge of, say, two equivalents of the former to two and one-fourth equivalents of the latter is heated until it is completely decomposed, the sodic carbonate formed then being lixiviated out and going to B, while the lime remaining goes to C. The reaction which takes place at A may be expressed as follows:
$2NaNO_3 + CaCO_3 = Na_2CO_3 + 2NO_2 + CaO + O$.
If only a small amount of water be employed in this lixiviation, sodic carbonate will be extracted. If a large amount of water be used, the sodic carbonate will on heating be converted into caustic soda with regeneration of the chalk. The nitrous fumes evolved during this decomposition are to be passed into a suitable chamber, where they are submitted to the simultaneous action of air or oxygen and water, and thus become converted into aqueous nitric acid. This operation is not illustrated on the diagram. Litharge or massicot is then to be dissolved in this nitric acid—say at D—and the plumbic nitrate so formed is then to be precipitated as plumbic chloride by the addition of a solution of sodic chloride (brine) at E. The plumbic chloride thus formed after being washed and dried is to be fused and decomposed electrolytically at F, as hereinafter described, to produce chlorine, which goes to G, and metallic lead, which goes to H, for the regeneration of the oxide (litharge or massicot) to be used again at D. The sodic nitrate formed at E at the same time as the plumbic chloride is evaporated and so recovered from its solution for use over again at A along with more calcic carbonate for the regeneration of nitric acid for continuing the operation.

The decomposition of the plumbic chloride by electrolysis is effected in the manner illustrated in Fig. 2 of the drawings. This electrolytical method affords an easy way of generating chlorine without the assistance of any oxidizing agent. The anode $a$ should be composed of graphite or other material unattackable by chlorine, and the operation should be conducted in a bell or closed vessel $b$, from which, if conductive, the anode should be insulated. This bell $b$ dips into fused plumbic chloride contained in a vessel $c$, (which is kept heated in any suitable manner,) while the anode $a$ is also immersed in the same salt. The bell $b$ and vessel $c$ may be of enameled iron, or be lined with or composed wholly of graphite or earthenware. The cathode $d$ may pass in at the bottom of the said vessel $c$ and be made of iron, tinned to insure good electrical contact. The anode and cathode being in connection with the terminals of a suitable source of electricity producing a current of low tension and the temperature of the fused chloride being higher than that of molten lead, the fused metal resulting from the decomposition of the chloride by the electric current will collect at the bottom, and, surrounding the cathode, will virtually form a cathode of large area, while the chlorine also generated by the electrolysis of the chloride will rise in the bell b and pass out through pipe e to a receiver. The molten metal being drawn off from below through opening f while fresh chloride is added to the fused chloride above the process is rendered continuous. The lead so obtained is to be oxidized into massicot in the ordinary way for further treatment at D with the regenerated nitric acid coming from E, as before described.

Having now particularly described and ascertained the nature of the said invention and in what manner the same is to be performed, I declare that what I claim is—

The herein-described conjoint process of continuously producing sodic or potassic carbonate and chlorine, which consists in decomposing sodic or potassic nitrate by heating it with calcic carbonate, lixiviating out the sodic carbonate and converting the nitrous fumes evolved into aqueous nitric acid by the action of air or oxygen and water, dissolving plumbic oxide in the nitric acid, precipitating plumbic chloride by means of sodic or potassic chloride, fusing the plumbic chloride, and decomposing it electrolytically to form chlorine and metallic lead for use over again, as herein described.

The foregoing specification of my improvements in the production of alkaline carbonates and chlorine and their derivatives signed by me this 15th day of April, 1891.

FARNHAM MAXWELL LYTE.

Witnesses:
C. M. LYTE,
60 Finboro Road, S. W., Esquire, London.
WILMER M. HARRIS,
Notary Public, 17 Gracechurch Street, London, E. C.